(12) United States Patent
Makino et al.

(10) Patent No.: US 10,234,600 B2
(45) Date of Patent: Mar. 19, 2019

(54) OPTICAL MEMBER, METHOD FOR MANUFACTURING OPTICAL MEMBER, AND OPTICAL DEVICE

(71) Applicant: CANON KABUSHIKI KAISHA, Tokyo (JP)

(72) Inventors: Kenji Makino, Kawasaki (JP); Tomonari Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/456,370

(22) Filed: Mar. 10, 2017

(65) Prior Publication Data

US 2017/0269264 A1    Sep. 21, 2017

(30) Foreign Application Priority Data

Mar. 15, 2016  (JP) ................. 2016-051150

(51) Int. Cl.
   *G02B 1/118*    (2015.01)
   *G02B 1/04*    (2006.01)

(52) U.S. Cl.
   CPC ............... *G02B 1/118* (2013.01); *G02B 1/04* (2013.01)

(58) Field of Classification Search
   CPC .................................. G02B 1/118; G02B 1/04
   USPC ........................................................ 359/601
   See application file for complete search history.

(56) References Cited

U.S. PATENT DOCUMENTS

| 7,371,439 B2 * | 5/2008 | Matsunaga | B32B 27/08 428/1.3 |
| 9,500,777 B2 * | 11/2016 | Ibuki | G02B 1/118 |
| 2003/0076596 A1 * | 4/2003 | Miyatake | G02B 1/11 359/601 |
| 2012/0200933 A1 * | 8/2012 | Akiyama | G02B 5/0242 359/601 |
| 2015/0017386 A1 * | 1/2015 | Kolb | C08J 7/047 428/149 |

FOREIGN PATENT DOCUMENTS

| JP | 2001-233611 A | 8/2001 |
| JP | 2008-139581 A | 6/2008 |
| JP | 2013-41275 A | 2/2013 |

* cited by examiner

*Primary Examiner* — Collin X Beatty
*Assistant Examiner* — Grant A Gagnon
(74) *Attorney, Agent, or Firm* — Canon U.S.A., Inc. IP Division (57) ABSTRACT

A method for manufacturing an optical member includes a step of applying a dispersion liquid containing particles and a dispersion medium on a substrate, a step of applying a solution containing a component to form a binder after the step of applying the dispersion liquid, and causing the solution to permeate a portion between the particles contained in the dispersion liquid applied in advance to form a single layer in which the portion between the particles is filled with the binder, and a step of drying the layer to prepare an antireflection film. The solution contains a silane-alkoxy condensate having an average particle diameter of 8 nm or more and 60 nm or less, and the solution contains a solvent having solubility of water of 10% by weight or less in an amount of 70% by mass or more.

17 Claims, 4 Drawing Sheets

OPTICAL MEMBER, METHOD FOR MANUFACTURING OPTICAL MEMBER, AND OPTICAL DEVICE

BACKGROUND OF THE INVENTION

Field of the Invention

The present invention relates to an optical member having an antireflection film containing particles, an optical device, and a method for manufacturing an optical member.

Description of the Related Art

Conventionally, it has been known to form an antireflection film obtained by laminating a single layer or a plurality of layers of optical films having different refractive indices in a thickness of several tens to several hundreds nm in order to suppress reflection of an optical member at a light incident-emitting interface. In order to form the antireflection film, a vacuum film formation method such as vapor deposition or sputtering and a humid film formation method such as dip coating or spin coating are used.

It is known to use a transparent material having a low refractive index, an inorganic material such as silica, magnesium fluoride, or calcium fluoride, or an organic material such as a silicone resin or an amorphous fluororesin as a material used for an outermost layer of the antireflection film.

Japanese Patent Laid-Open No. 2013-41275 discloses a method for manufacturing an antireflection film obtained by arranging only particles densely by applying a dispersion liquid containing the particles and a dispersion medium on a substrate and then filling a portion between the particles with a solution containing a binder component.

However, in the antireflection film manufactured by the manufacturing method of Japanese Patent Laid-Open No. 2013-41275, the particles are densely arranged on a substrate side where an evaporation rate of the dispersion liquid is low. However, on a side where an evaporation rate of the dispersion liquid is high, opposite to the substrate, the particles cannot move freely in an evaporation process of the dispersion liquid, the particles are not arranged densely, and scattering is caused disadvantageously.

SUMMARY OF THE INVENTION

A method for manufacturing an optical member according to an aspect of the present invention includes a step of applying a dispersion liquid containing particles and a dispersion medium on a substrate, a step of applying a solution containing a component to form a binder after the step of applying the dispersion liquid, and causing the solution to permeate a portion between the particles contained in the dispersion liquid applied in advance to form a single layer in which the portion between the particles is filled with the binder, and a step of drying the layer to prepare an antireflection film. The method is characterized in that the solution contains a silane-alkoxy condensate having an average particle diameter of 8 nm or more and 60 nm or less, and the solution contains a solvent having solubility of water of 10% by weight or less in an amount of 70% by mass or more.

The optical member according to an aspect of the present invention is an optical member having an antireflection film containing particles and a binder on a substrate. The optical member is characterized in that a two-dimensional porosity on a surface at a depth corresponding to an average particle diameter of the particles from the opposite side to the substrate of the antireflection film is 11% or more and 15% or less in a cross section containing a normal line on a surface of the substrate.

Further features of the present invention will become apparent from the following description of exemplary embodiments (with reference to the attached drawings).

DESCRIPTION OF THE EMBODIMENTS

Hereinafter, an embodiment of the present invention will be described in detail.

[Optical Member]

The present invention relates to an optical member having an antireflection film containing particles and a binder on a substrate. The optical member according to an aspect of the present invention is characterized in that a two-dimensional porosity on a surface at a depth corresponding to an average particle diameter of the particles from the opposite side to the substrate of the antireflection film is 11% or more and 15% or less in a cross section containing a normal line on a surface of the substrate.

The optical member according to an aspect of the present invention can be used for an optical film, a lens, a prism, or the like.

Figure 1:
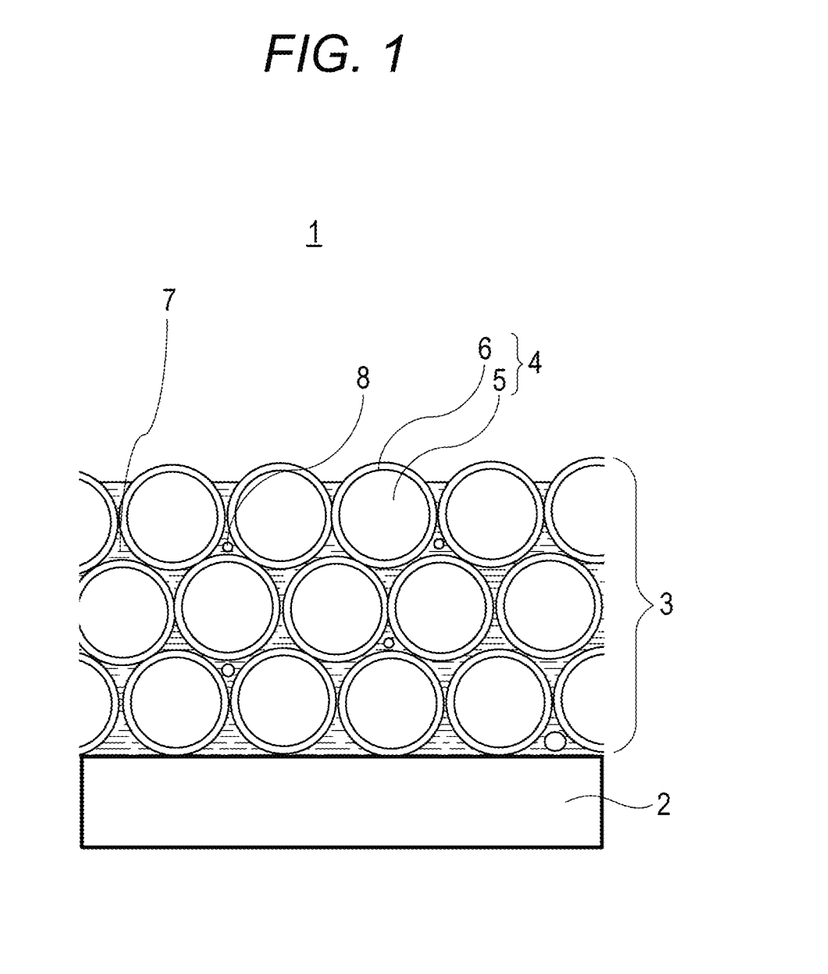
FIG. 1 is a schematic diagram illustrating an optical member according to an embodiment of the present invention.

FIG. 1 is a schematic diagram illustrating an optical member according to an embodiment of the present invention. In FIG. 1, an optical member 1 has an antireflection film 3 formed on a substrate 2. The antireflection film 3 has a layer formed by laminating a plurality of stages of particles 4 arranged in a direction parallel to a surface of the substrate 2. Each of the particles 4 may be a hollow particle or a solid particle. In addition, each of the particles 4 may be a chain particle. FIG. 1 illustrates a case where each of the particles 4 is a hollow particle. Each of the hollow particles 4 has a vacancy 5 therein, and has a shell 6 outside the vacancy 5. In the antireflection film 3, a portion between the particles 4 is filled with a binder 7. The particles 4 are bonded to each other by the binder 7. A plurality of voids 8 is formed in the binder 7.

(Substrate)

As the substrate 2, a plastic, glass, a resin, or the like can be used. The shape thereof is not limited, but may be a flat surface, a curved surface, a recess surface, a protrusion surface, or a film shape.

(Antireflection Film)

The antireflection film 3 preferably has a layer formed by laminating a plurality of stages of particles 4 arranged in a direction parallel to a surface of the substrate 2. A portion between the particles 4 is filled with the binder 7.

The thickness of the layer formed by laminating the plurality of stages of particles arranged in a direction parallel to a surface of the substrate is preferably 80 nm or more and 200 nm or less. When the thickness of the layer is less than 80 nm or more than 200 nm, reflectance is large.

In the antireflection film 3 according to an aspect of the present invention, the particles 4 are densely arranged on the opposite side to the substrate compared with a conventional antireflection film. An arrangement property of the particles 4 on a surface of the antireflection film 3 can be represented by a two-dimensional porosity on the surface. In the antireflection film 3 according to an aspect of the present invention, a two-dimensional porosity on a surface at a depth corresponding to an average particle diameter of the particles 4 from the opposite side to the substrate is 11% or more and 15% or less in a cross section containing a normal line on a surface of the substrate 2.

In general, an arrangement property on a surface can be evaluated by a surface roughness using an atomic force microscope (AFM). However, an arrangement property including a void on a back side of a particle which a cantilever cannot enter cannot be evaluated. Therefore, the arrangement property of the particles 4 on the opposite surface to the substrate is measured by subjecting an observed cross section of a flat surface containing a normal line on a substrate surface for a film to image processing with a reflection electron microscope. As the image processing method, commercially available image processing such as image J or image-Pro PLUS (manufactured by Media Cybernetics, Inc.) can be used. In a predetermined image region, contrast adjustment is performed appropriately, if necessary, an area of particles is measured by particle measurement, and a porosity with respect to the area of the predetermined image region can be calculated.

The width of a region for calculating a two-dimensional porosity on the surface is preferably about 500 nm or more and 3 μm or less although depending on a resolution of a scanning transmission electron microscope. Particularly, when the width is 500 nm or less, a partial state of the antireflection film 3 is observed, and this case is not suitable for evaluation as an optical member. When the width is 3 μm or more, a surface state is not easily comprehended.

Figure 2:
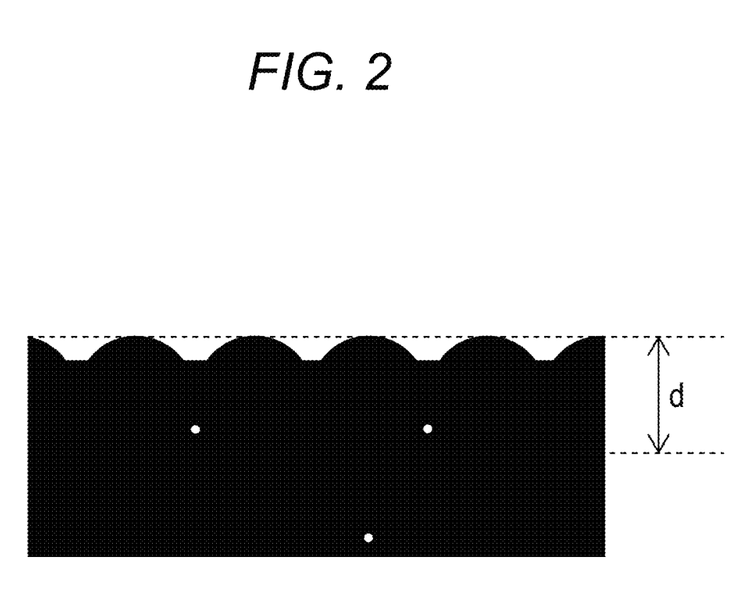
FIG. 2 is a diagram for explaining a two-dimensional porosity on a surface.

Details of a method for calculating the two-dimensional porosity on the surface are as follows. That is, as illustrated in FIG. 2, in a predetermined image region of a cross-sectional observation image of a scanning transmission electron microscope, binarization is performed, a hollow portion is filled by image processing when each of the particles is a hollow particle, and a portion occupied by the particles is extracted. Subsequently, in an area of an image region to be analyzed, by calculating a depth d corresponding to an average particle diameter from the outside air side of the antireflection film and an area of a portion occupied by a void in any width of 500 nm or more and 3 μm or less, the two-dimensional porosity on the surface can be determined.

The two-dimensional porosity on the surface in an ideal arrangement in which particles are arranged so as to be adjacent to each other is 10.75%. In the antireflection film 3 according to an aspect of the present invention, the two-dimensional porosity on the surface is 11% or more and 15% or less, and the particles 4 on the opposite side to the substrate are also arranged densely.

(Particle)

An average particle diameter of the particles 4 is 5 nm or more and 100 nm or less, and preferably 15 nm or more and 60 nm or less. In a case where the hollow particles 4 are used, when the average particle diameter is less than 15 nm, it is difficult to form a particle serving as a core stably. When the average particle diameter is more than 100 nm, the size of a void between the particles 4 is large, a large void is thereby generated easily, and scattering occurs in accordance with the size of each of the particles. Therefore, the average particle diameter of more than 100 nm is not preferable. Each of the particles 4 may be a chain particle in which a plurality of particles is bonded to each other in a chain form. Here, the average particle diameter of the particles 4 is an average Feret diameter. This Feret diameter can be measured by image processing of an observed transmission electron microscope image. As the image processing method, commercially available image processing such as image-Pro PLUS (manufactured by Media Cybernetics, Inc.) can be used. In a predetermined image region, contrast adjustment is performed appropriately, if necessary, an average Feret diameter of each particle is measured by particle measurement, and an average value can be calculated and determined.

As the particles 4, particles of a metal oxide or an organic resin formed of silicon dioxide, magnesium fluoride, fluorine, silicone, or the like can be used. Each of the particles 4 may be a solid particle of an organic resin formed of silicon dioxide, magnesium fluoride ($MgF_2$), fluorine, silicone, or the like.

Each of The particles 4 is preferably a hollow particle having the vacancy 5 therein and having the shell 6 around an outside of the vacancy 5. A refractive index of an antireflection film can be reduced by the air (refractive index 1.0) contained in the vacancy 5. As the vacancy 5, either a single pore vacancy or a porous vacancy can be used, and can be selected appropriately. A material constituting a hollow particle preferably has a low refractive index. Examples thereof include an organic resin formed of $SiO_2$, $MgF_2$, fluorine, silicone, or the like. However, a hollow silica particle which is manufactured easily is more preferable. Examples of a method for manufacturing a $SiO_2$ hollow particle include methods described in Japanese Patent Laid-Open No. 2001-233611 and Japanese Patent Laid-Open No. 2008-139581. The hollow particle can reduce a refractive index of a layer formed by laminating a plurality of stages of particles arranged in a direction parallel to a surface of the substrate. A case where each of the particles 4 is a hollow particle is preferable because of further exhibiting an effect of the present invention. The thickness of the shell 6 of the hollow particle is 10% or more and 50% or less of an average particle diameter thereof, and preferably 20% or more and 35% or less of an average particle diameter thereof. When the thickness of the shell 6 is less than 10%, strength of the particles is small. When the thickness of the shell 6 is more than 50%, a reduction effect of the refractive index is small.

The content of the particles 4 is preferably 50% by mass or more and 85% by mass or less, and more preferably 75% by mass or more and 85% by mass or less with respect to the antireflection film according to an aspect of the present invention.

(Binder)

The binder 7 is preferably a silane-alkoxy hydrolysis condensate having an average particle diameter of 8 nm to 60 nm, and more preferably a silane-alkoxy hydrolysis condensate having an average particle diameter of 8 nm to 45 nm, measured by a dynamic light scattering method.

The binder 7 contains the plurality of voids 8. The state in which the binder 7 contains the plurality of voids 8 means a state in which the binder 7 itself contains a void and contains the voids 8 separately from the vacancy 5 of the hollow particles 4. In this way, the binder contains a void separately from a vacancy of the hollow particles, and the refractive index of the antireflection film can be thereby further reduced.

The content of the entire voids 8 contained in the binder 7 in the layer formed by laminating a plurality of stages of particles arranged in a direction parallel to a surface of the substrate 2 is preferably 5% by volume or more and 25% by volume or less, and more preferably 10% by volume or more and 20% by volume or less. Here, the % by volume is a ratio of a volume of the entire voids with respect to the volume of the entire layer (volume ratio).

(Other Layers)

One or more layers of a high refractive index layer having a higher refractive index than the antireflection film 3, an intermediate refractive index layer having a refractive index in the middle of the antireflection film 3 and the high refractive index layer, and the like may be present between the antireflection film 3 and the substrate 2. For the high refractive index layer, zirconium oxide, titanium oxide, tantalum oxide, niobium oxide, or hafnium oxide can be used. For the intermediate refractive index layer, alumina, silica, magnesium fluoride, or the like can be used. By depositing these materials on a substrate by a vapor deposition method, sputtering, or the like, a film can be formed.

One or more layers having functionality such as water repellency or oil repellency may be formed on the antireflection film 3. Examples thereof include a coating material containing fluorine and a silicone coating material.

These refractive index layers and functional layers can be formed by a vapor deposition method, a sputtering method, a CVD method, a dip coating method, a spin coating method, a spray coating method, or the like.

[Method for Manufacturing Optical Member]

Next, an example of a method for manufacturing an optical member according to an aspect of the present invention will be described.

In the method for manufacturing an optical member according to an aspect of the present invention, a dispersion liquid containing the particles 4 and a dispersion medium is applied on the substrate 2. Thereafter, a solution containing a component required for forming a binder containing a silane-alkoxy hydrolysis condensate having an average particle diameter of 8 nm or more and 60 nm or less measured by a dynamic light scattering method is applied. The method is characterized in that a single layer in which a portion between the particles 4 is filled with the binder 7 is thereby formed and the layer is dried.

First, by applying the dispersion liquid containing the particles 4, the particles 4 are sequentially arranged from a surface of the substrate 2, and are laminated to form a stage. When the particles 4 are arranged on the surface of the substrate 2, the particles 4 have a high arrangement property. This is because the particles 4 on the surface of the substrate 2 can move freely due to sufficient presence of a solvent therearound. On the other hand, the arrangement property of the particles 4 is reduced on the opposite side to the substrate 2. This is because the amount of a solvent around the particles 4 on the opposite side to the substrate 2 is less than that on the substrate 2 side due to volatilization of the dispersion medium in the dispersion liquid.

In the method for manufacturing an optical member according to an aspect of the present invention, a solvent in which the particles 4 are not easily dissolved is used for the solution containing a component to form the binder 7, and a silane-alkoxy hydrolysis condensate having an average particle diameter of 8 nm or more and 60 nm or less is used. By using such a solution, it is considered that when a portion between the particles 4 is filled with the solution to form the binder 7, the particles 4 on the opposite surface to the substrate 2 are moved to improve the arrangement property of the particles 4.

(Step for Applying Dispersion Liquid Containing Particles)

When hollow silica is used as the particles 4 used for the dispersion liquid, it is preferable to use a trifunctional silane in which a methyl group is modified, such as methyl triethoxy silane or methyl trimethoxy silane as a precursor to form a wall of a hollow particle. As a material used for the precursor, a mixture of the above trifunctional silane and a tetrafunctional silane such as tetraethoxy silane may be used, and it is only necessary to select a composition capable of achieving stable particle manufacturing.

The concentration of the particles 4 contained in the dispersion liquid containing the particles 4 and a dispersion medium is desirably low in a range capable of forming a film having a desired film thickness. As the solid concentration is increased, the viscosity is increased. Therefore, the arrangement property of the particles is reduced, a dispersion state is deteriorated, and therefore it is difficult to form a uniform void therein. Therefore, a film is desirably formed under a condition capable of forming a film in a state in which the solid concentration is lower. The dispersion liquid preferably contains no component to form a binder in order to improve the arrangement property of the particles 4.

As a method for applying a dispersion liquid, a general application method of a coating liquid, such as a spin coating method or a spray coating method can be used. A film of a coating material is preferably formed by spin coating because a film having a uniform film thickness can be formed on a substrate having a curved surface such as a lens.

(Step of Forming a Single Layer by Filling with Binder Component)

In the method for manufacturing an optical member according to an aspect of the present invention, a solution containing a component required for forming a binder contains a silane-alkoxy (hydrolysis) condensate having an average particle diameter of 8 nm or more and 60 nm or less measured by a dynamic light scattering method. The present inventors have found that such a silane-alkoxy condensate having an average particle diameter of 8 nm or more and 60 nm or less rearranges the particles 4 on an uppermost surface in a process in which a solution having a portion between the particles 4 filled with the binder 7 is dried. The silane-alkoxy condensate more preferably has an average particle diameter of 8 nm to 45 nm. The silane-alkoxy condensate preferably has a weight average molecular weight of 4000 or more and 40000 or less in terms of polystyrene. When the weight average molecular weight is less than 4000, coatability is lowered. When the weight average molecular weight is more than 40000, a reaction progresses non-uniformly to cause gelling, or the viscosity is increased, and therefore a state not suitable for a coating liquid may be obtained.

In order to generate a silane-alkoxy hydrolysis condensate by hydrolysis of an alkoxy silane, the alkoxy silane and water are stirred for a reaction. The alkoxy silane as a precursor of the silane-alkoxy hydrolysis condensate is not compatible with water. Therefore, when the alkoxy silane, water, and a catalyst are mixed, the resulting mixture is in a two layer separated state in an initial reaction stage. When the reaction progresses, an alkoxide becomes silanol. By an increase in a hydrophilic group, a hydrolysate of the alkoxy silane is dissolved in a water layer, the two layer separated state disappears, and a uniform mixture is obtained. As a catalyst for promoting a hydrolysis, an acid or a base may be added. When the concentration of the hydrolysate of the alkoxy silane in the water layer is too high, gelling occurs due to rapid progress of a reaction with water, or the viscosity is increased. Therefore, an aqueous solvent is preferably added in an amount of 10% by weight or more with respect to the alkoxy silane as a raw material. The aqueous solvent described here means a solvent having a solubility of water of 80% by weight or more with respect to a solvent at 23° C. As the aqueous solvent, cellosolve or glycol ether is preferable. Examples thereof include 2-methoxy-ethanol, 2-ethoxy ethanol, 2-isopropoxy ethanol, 1-methoxy-2-propanol, and 1-ethoxy-2-propanol.

By a heating condition of a mixed solution of the alkoxy silane and water, the particle diameter of the silane-alkoxy hydrolysis condensate can be controlled. A heating temperature is appropriately selected from a range of 40° C. or higher and 100° C. or lower, and heating time is appropriately selected from a range of 20 minutes or more and 80 minutes or less according to a desired particle diameter. When a trial to generate a silane-alkoxy hydrolysis condensate having an average particle diameter of 60 nm or more is performed, a reaction progresses rapidly, and therefore gelling occurs.

The concentration of the component required for forming a binder is preferably 0.5% by mass or more and 2.0% by mass or less. The concentration of less than 0.5% by mass is insufficient for binding particles, and the strength of a film is lowered. On the other hand, when the concentration is more than 2.0% by mass, the component required for forming a binder forms a film having a higher refractive index than a particle film on the particle film, and an antireflection effect is reduced.

As the dispersion medium used for the dispersion liquid, a dispersion medium having excellent affinity with the particles 4 can be selected appropriately. Aggregating is observed in a dispersion medium having low affinity. When affinity between a solvent contained in a solution containing a component required for forming a binder and the component required for forming a binder is low, the component required for forming a binder is not compatible. Even when the component is dispersed and compatible as a coating material, aggregating or separation occurs during film formation, and a whitening phenomenon occurs. A dispersion medium or a solvent having a boiling point of 100° C. or higher and 200° C. or lower is preferably used. It is necessary to select a solvent according to hydrophilicity or hydrophobicity on a surface of a hollow particle. When the hollow particle is caused to be hydrophobic by treating the hollow particle with a silane coupling agent, the solvent contained in a solution containing a component required for forming a binder is preferably a hydrophilic solvent. It is preferable to use a trifunctional silane in which a methyl group is modified, such as methyl triethoxy silane or methyl trimethoxy silane as a precursor of the hollow particle. The solution containing a component required for forming a binder preferably contains a solvent in which the solubility of water in a solvent is 10% by weight or less as a solvent in addition to a hydrophilic solvent. The solution containing a component required for forming a binder preferably contains the solvent in which the solubility of water in a solvent is 10% by weight or less in an amount of 70% by mass or more. Examples of the solvent in which the solubility of water in a solvent is 10% by weight or less include 4-methyl-2-pentanol, 2-pentanol, 2-methyl-1-butanol, 3-methyl-1-butanol, and 2-ethyl-1-butanol. The dispersion liquid contains one or more kinds of these solvents.

As a concentration of a component required for forming a binder in the solution containing a component required for forming a binder, it is only necessary to form a film at a concentration to bring about a desired content with respect to a formed film of particles, and the concentration can be selected appropriately according to a solvent and a film formation condition.

As a method for applying the solution containing a component to form the binder 7, a general application method of a coating liquid, such as a spin coating method or a spray coating method can be used. A film of a coating material is preferably formed by spin coating because a film having a uniform film thickness can be formed on a substrate having a curved surface such as a lens.

(Step of Preparing Antireflection Film)

The solution is applied to form a single layer, and then drying is performed. Drying can be performed using a dryer, a hot plate, an electric furnace, or the like. As a drying condition, temperature and time capable of evaporating an organic solvent in the hollow particle without having an influence on the substrate are used. In general, temperature of 300° C. or lower is preferably used.

EXAMPLES

Hereinafter, the present invention will be described specifically based on Examples. However, the present invention is not limited to the Examples.

A solution containing a component required for forming a binder (hereinafter, referred to as a binder solution) and a dispersion liquid containing particles and a dispersion medium were prepared by the following methods.

(1) Preparation of Binder Solution 1

To 7.7 g of 1-ethoxy-2-propanol (manufactured by Kishida Chemical Co., Ltd.), 26.0 g of tetraethoxy silane (TEOS manufactured by Tokyo Chemical Industry Co., Ltd.) and 22.5 g of 0.01 M diluted hydrochloric acid having an equivalent weight of 10 with respect to TEOS as catalyst water were added, and the resulting mixture was stirred for 60 minutes. The resulting mixture was further stirred for 40 minutes in an oil bath at 60° C. to prepare binder solution 1. Thereafter, 1-ethoxy-2-propanol and 2-ethyl butanol were added thereto such that the solid concentration of silica was finally 0.8 wt % to adjust the binder solution. A ratio between 1-ethoxy-2-propanol and 2-ethyl butanol in the binder solution was 3/7. Table 2 indicates a particle diameter of a silane-alkoxy hydrolysis condensate in the prepared binder solution, materials used for preparation, and solubility of water in the solvents.

(Preparation of Binder Solution 2)

Binder solution 2 was prepared in a similar manner to binder solution 1 except that the mixed solution of 1-ethoxy-2-propanol, TEOS, and 0.01 M diluted hydrochloric was stirred for 80 minutes in an oil bath at 60° C.

(Preparation of Binder Solution 3)

Binder solution 3 was prepared in a similar manner to binder solution 1 except that the mixed solution of 1-ethoxy-2-propanol, TEOS, and 0.01 M diluted hydrochloric was stirred for 35 minutes while being refluxed in an oil bath at 85° C.

(Preparation of Binder Solution 4)

Binder solution 4 was prepared in a similar manner to binder solution 1 except that the mixed solution of 1-ethoxy-2-propanol, TEOS, and 0.01 M diluted hydrochloric was stirred for 45 minutes while being refluxed in an oil bath at 85° C.

(Preparation of Binder Solution 5)

Binder solution 5 was prepared in a similar manner to binder solution 1 except that the mixed solution of 3.4 g of 1-ethoxy-2-propanol, TEOS, and 0.01 M diluted hydrochloric was stirred for 30 minutes while being refluxed in an oil bath at 85° C.

(Preparation of Binder Solution 6)

Binder solution 6 was prepared in a similar manner to binder solution 1 except that 2-ethyl butanol was changed to 4-methyl-2-pentanol.

(Preparation of Binder Solution 7)

Binder solution 7 was prepared in a similar manner to binder solution 1 except that 2-ethyl butanol was changed to 2-butyl-1-butanol.

(Preparation of Binder Solution 8)

Binder solution 8 was prepared in a similar manner to binder solution 1 except that the mixed solution of 3.4 g of 1-ethoxy-2-propanol, TEOS, and 0.01 M diluted hydrochloric was stirred for 45 minutes while being refluxed in an oil bath at 85° C.

(Preparation of Binder Solution 9)

Binder solution 9 was prepared in a similar manner to binder solution 1 except that the mixed solution of 1-ethoxy-2-propanol, TEOS, and 0.01 M diluted hydrochloric was stirred for 20 minutes in an oil bath at 60° C.

(Preparation of Binder Solution 10)

Binder solution 10 was prepared in a similar manner to binder solution 1 except that 2-ethyl butanol was changed to 1-ethoxy-2-pentanol.

(Preparation of Binder Solution 11)

Binder solution 11 was prepared in a similar manner to binder solution 1 except that 2-ethyl butanol was changed to ethyl lactate.

(Preparation of Binder Solution 12)

Binder solution 12 was prepared in a similar manner to binder solution 1 except that TEOS was changed to methyl triethoxy silane (MTES manufactured by Tokyo Chemical Industry Co., Ltd.).

(Preparation of Binder Solution 13)

6 g of silane-alkoxy hydrolysis condensate Accu-Glass T-11 (111) (manufactured by Honeywell Inc., solid concentration 4.5 wt %) was diluted with 27.8 g of 2-ethyl-1-butanol to prepare a solution having a solid concentration of 0.8 wt %.

(2) Preparation of Dispersion Liquid Containing Particle and Dispersion Medium 6.0 g of hollow silica slurry IPA dispersion liquid (Sururia 1110 manufactured by JGC C&C, average Feret diameter 50 nm, solid concentration 20.5 wt %) was diluted with 2-n-butoxy ethanol (special grade manufactured by Kishida Chemical Co., Ltd.). A dispersion liquid having a solid concentration of 4.0 wt % was thereby prepared.

Optical members obtained in Examples and Comparative Examples were evaluated by the following methods. Table 1 indicates a result thereof.

(3) Two-Dimensional Porosity on Surface

The prepared antireflection film 3 was cut by a surface containing a normal line on a surface of the substrate 2.

The cross section of the cut antireflection film 3 was cut out in a thickness of 50 nm to prepare a sample.

The cross section of the sample was photographed at a factor of 100000 using a scanning transmission electron microscope.

Subsequently, the photographed image was subjected to binary coded processing using an image software image J. The hollow particles 4 and the binder 7 were represented by black, and a space between the void 8 and a surface was represented by white. Subsequently, the surface of the antireflection film 3 was cut out at a depth of an average particle diameter of the particles 4 at a width of 500 nm, an area ratio of the white portion with respect to an evaluation area was determined from the area of the film portion, and this ratio was used as a two-dimensional porosity on the surface.

(4) Measurement of Reflectance

Reflectance in a wavelength of 400 nm to 700 nm was measured using a lens reflectance measurement machine (USPM-RU manufactured by Olympus Corporation) to determine refractive index of an antireflection film and a film thickness thereof from refractive index of a substrate and a wavelength having minimum reflectance.

Reflectance was evaluated based on the following criteria.

A: Reflectance of less than 0.1%
B: Reflectance of 0.1% or more (5) Measurement of Pushing Strength An optical element having an antireflection film formed on the flat plate glass substrate 2 (S-BSL7, $n_d$=1.52, manufactured by Ohara Inc.) was formed, and pushing strength thereof was measured by pressing an indenter to the antireflection film perpendicularly to a surface having the antireflection film formed. A pushing strength measurement nanoindenter (NANO G200 manufactured by Nano Instruments Ltd.) was used. Conditions for measuring pushing strength were as follows.

Mode: DCM mode
SURFACE APPROACH DISTANCE: 1000 nm
SURFACE APPROACH VELOCITY: 10 nm/s
SURFACE DETECT STIFFNESS CRITERIA: 200 N/m
DEPTH LIMIT: 250 nm
STAIN RATE TARGET: 0.051/S
HARMONIC DISPLACEMENT TARGET: 1 nm
POISSONS RATIO: 0.25

Pushing strength was evaluated based on the following criteria.

A: 1 GPa or more
B: less than 1 GPa (6) Measurement of Minute Light Scattering Value Light emitted by a 150 W halogen fiber illumination device (PHL-150C) as a light source passed through a rod homogenizer (RHO-13S-E2), and illuminance was set to 4000×1 by an iris diaphragm. The light was applied to the optical element at an angle of 45°, and a measurement sample was photographed from a front surface thereof using a camera (Canon EOS40D) equipped with a camera lens (Compact-Macro Lens EF 50 mm). Photographing was performed under conditions of a shutter speed of 10 seconds and a diaphragm of F10, and ISO400. The surface having the antireflection film formed was caused to face a light source side.

The obtained image was analyzed by a general image processing software (Adobe Photo Shop). 700×700 pixels were quantified, and luminance was represented by a natural number.

Minute light scattering was evaluated based on the following criteria.

A: less than 15
B: 15 or more and less than 20
C: 20 or more

Example 1

To a flat plate glass (S-BSL7, $n_d$=1.52, manufactured by Ohara Inc.) obtained by laminating a film having a film thickness and refractive index illustrated in Table 3, 0.2 mL of a dispersion liquid containing particles and a dispersion medium was dropwise added, and spin coating was performed at 3000 rpm for 20 seconds. Thereafter, 0.2 mL of binder solution 1 was dropwise added, and this flat plate glass was fired in a hot air-circulated oven at 200° C. for two hours to prepare an optical member. The obtained optical member was evaluated as indicated in Table 1.

Figure 3:
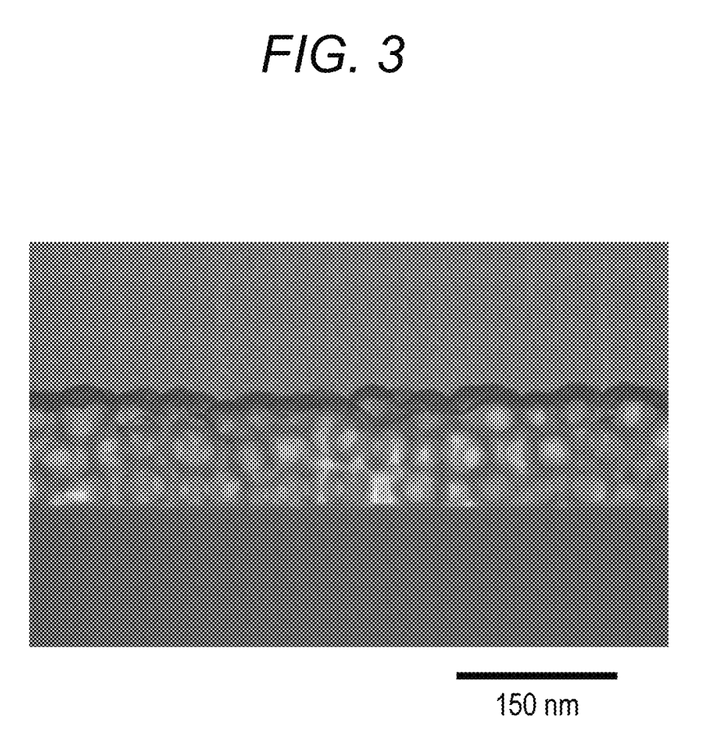
FIG. 3 is a scanning transmission electron micrograph of an optical member in Example 1.

FIG. 3 illustrates a scanning transmission electron micrograph of an optical member having a particle film formed in Example 1. A particle film having three layers of particles laminated was formed, and a high arrangement property of particles on an uppermost surface on the opposite side to the substrate was observed.

Example 2

An optical member was manufactured and evaluated in a similar manner to Example 1 except that binder solution 1 was changed to binder solution 2.

Example 3

An optical member was manufactured and evaluated in a similar manner to Example 1 except that binder solution 1 was changed to binder solution 3.

Example 4

An optical member was manufactured and evaluated in a similar manner to Example 1 except that binder solution 1 was changed to binder solution 4.

Example 5

An optical member was manufactured and evaluated in a similar manner to Example 1 except that binder solution 1 was changed to binder solution 5.

Example 6

An optical member was manufactured and evaluated in a similar manner to Example 1 except that binder solution 1 was changed to binder solution 6.

Example 7

An optical member was manufactured and evaluated in a similar manner to Example 1 except that binder solution 1 was changed to binder solution 7.

Example 8

An optical member was manufactured and evaluated in a similar manner to Example 1 except that binder solution 1 was changed to binder solution 8.

Comparative Example 1

To a flat plate glass (S-BSL7, $n_d$=1.52, manufactured by Ohara Inc.) obtained by laminating a film having a film thickness and refractive index illustrated in Table 3, 0.2 mL of a dispersion liquid containing particles and a dispersion medium was dropwise added, and spin coating was performed at 3000 rpm for 20 seconds. Thereafter, a binder solution was not applied to this flat plate glass, and the flat plate glass was fired in a hot air-circulated oven at 200° C. for two hours to prepare and evaluate an optical member.

Comparative Example 2

An optical member was manufactured and evaluated in a similar manner to Example 1 except that binder solution 1 was changed to binder solution 9.

Figure 4:
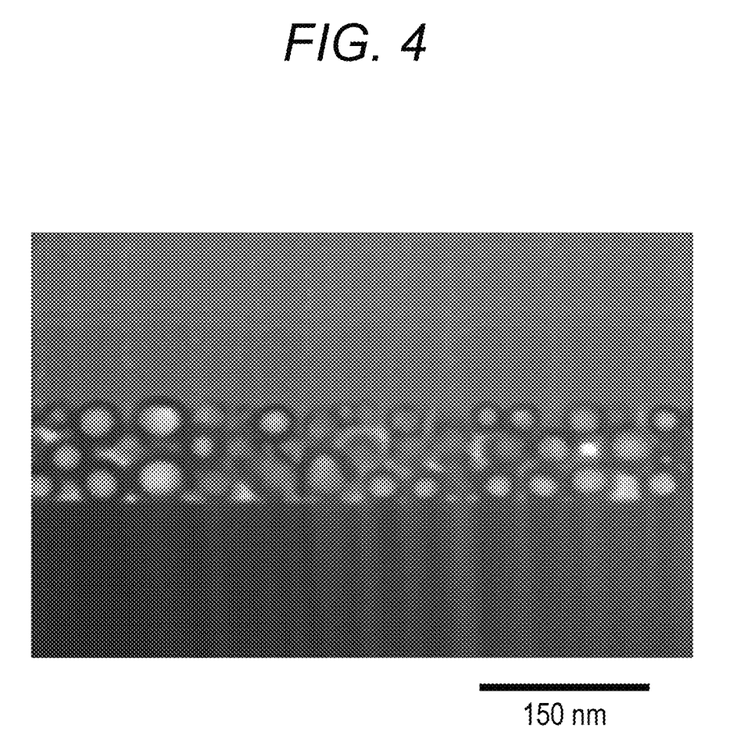
FIG. 4 is a scanning transmission electron micrograph of an optical member in Comparative Example 1.

FIG. 4 illustrates a scanning transmission electron micrograph of an optical member having a particle film formed in Comparative Example 1. A particle film having three layers of particles laminated was formed, but turbulence of particle arrangement on an uppermost surface was observed.

Comparative Example 3

An optical member was manufactured and evaluated in a similar manner to Example 1 except that binder solution 1 was changed to binder solution 10.

Comparative Example 4

An optical member was manufactured and evaluated in a similar manner to Example 1 except that binder solution 1 was changed to binder solution 11.

Comparative Example 5

An optical member was manufactured and evaluated in a similar manner to Example 1 except that binder solution 1 was changed to binder solution 12.

Comparative Example 6

An optical member was manufactured and evaluated in a similar manner to Example 1 except that binder solution 1 was changed to binder solution 13.

TABLE 1

| | Binder | Two-dimensional porosity on surface (%) | Average reflectance Evaluation | (%) | Pushing strength Evaluation | (GPa) | Minute light scattering Evaluation | Scattering value |
|---|---|---|---|---|---|---|---|---|
| Example 1 | Binder 1 | 14 | A | 0.08 | A | 1.0 | B | 18 |
| Example 2 | Binder 2 | 14 | A | 0.09 | A | 1.2 | B | 17 |
| Example 3 | Binder 3 | 11 | A | 0.05 | A | 1.4 | A | 13 |
| Example 4 | Binder 4 | 11 | B | 0.12 | A | 1.1 | A | 11 |
| Example 5 | Binder 5 | 14 | A | 0.08 | A | 1.2 | B | 16 |
| Example 6 | Binder 6 | 14 | A | 0.08 | A | 1.2 | B | 18 |
| Example 7 | Binder 7 | 15 | A | 0.08 | A | 1.1 | B | 19 |
| Example 8 | Binder 8 | 10 | B | 0.20 | B | 0.8 | A | 11 |

TABLE 1-continued

| | Binder | Two-dimensional porosity on surface (%) | Average reflectance Evaluation | (%) | Pushing strength Evaluation | (GPa) | Minute light scattering Evaluation | Scattering value |
|---|---|---|---|---|---|---|---|---|
| Comparative Example 1 | None | 29 | B | 0.15 | B | 0.6 | C | 20 |
| Comparative Example 2 | Binder 9 | 30 | B | 0.18 | B | 0.8 | C | 36 |
| Comparative Example 3 | Binder 10 | 25 | B | 0.10 | A | 1.3 | C | 31 |
| Comparative Example 4 | Binder 11 | 32 | B | 0.12 | A | 1.1 | C | 41 |
| Comparative Example 5 | Binder 12 | 30 | B | 0.20 | B | 0.7 | C | 36 |
| Comparative Example 6 | Binder 13 | 29 | B | 0.10 | B | 0.7 | C | 35 |

TABLE 2

| Binder solution | Silica raw material | Particle diameter of silane-alkoxy hydrolysis condensate (nm) | Solvent | Solubility of water in solvent (% by mass) |
|---|---|---|---|---|
| Binder solution 1 | TEOS | 8 | 2-ethyl-butanol | 4.6 |
| Binder solution 2 | TEOS | 12 | 2-ethyl-butanol | 4.6 |
| Binder solution 3 | TEOS | 23 | 2-ethyl-butanol | 4.6 |
| Binder solution 4 | TEOS | 45 | 2-ethyl-butanol | 4.6 |
| Binder solution 5 | TEOS | 8 | 4-methyl-2-pentanol | 5.8 |
| Binder solution 6 | TEOS | 8 | 2-butyl-1-butanol | 7.8 |
| Binder solution 7 | TEOS | 8 | 3-butyl-1-butanol | 7.4 |
| Binder solution 8 | TEOS | 60 | 2-ethyl-butanol | 4.6 |
| Binder solution 9 | TEOS | 6 | 2-ethyl-butanol | 4.6 |
| Binder solution 10 | TEOS | 8 | 1-ethoxy-2-pentanol | ∞ |
| Binder solution 11 | TEOS | 8 | Ethyl lactate | ∞ |
| Binder solution 12 | MTES | 257 | 2-ethyl-butanol | 4.6 |
| Binder solution 13 | Accu-Glass T-11 | 4 | 2-ethyl-butanol | 4.6 |

TABLE 3

| Film configuration | Refractive index (=550 nm) | Film thickness (nm) |
|---|---|---|
| Ninth layer | 1.47 | 20.1 |
| Eighth layer | 2.20 | 22.4 |
| Seventh layer | 1.66 | 79.9 |
| Sixth layer | 2.20 | 270.1 |
| Fifth layer | 1.66 | 31.7 |
| Fourth layer | 2.20 | 20.4 |
| Third layer | 1.66 | 10.0 |
| Second layer | 2.20 | 14.9 |
| First layer | 1.66 | 118.7 |
| Substrate | 1.52 | — |

[Performance Evaluation]

Results in Examples 1 to 4 indicate that an optical member having a two-dimensional porosity of 11% to 15% on a surface has a low minute light scattering value, low average reflectance, and high strength. Results in Examples 5 to 7 indicate that an optical member formed of a binder solution containing a solvent having solubility of water of 10% by weight or less in the solvent and a dispersion liquid containing particles and a dispersion medium has a low minute light scattering value, low average reflectance, and high strength.

Results in Example 8 indicate that when a component required for forming a binder (silane-alkoxy hydrolysis condensate) has a particle diameter of more than 45 nm, a minute light scattering value is low but reflectance and strength are lower than those in Example 1. For rearrangement of particles on a surface, a particle diameter of the component required for forming a binder (silane-alkoxy hydrolysis condensate) is required to be 8 nm or more. However, when the particle diameter is too large, the component does not permeate a particle film, a film formed of the component required for forming a binder (silane-alkoxy hydrolysis condensate) is formed on the surface, a binding force between the particles is insufficient, and refractive index on the surface is high. Therefore, it is considered that reflectance is deteriorated.

The optical member on which a binder solution has not been applied in Comparative Example 1 has a two-dimensional porosity of more than 15% on a surface, has a poorer arrangement property on the surface than the optical member according to an aspect of the present invention, and therefore has a high minute light scattering value. Results in Comparative Example 2 indicate that when a component required for forming a binder (silane-alkoxy hydrolysis condensate) contained in a binder solution has a particle diameter of less than 8 nm, the two-dimensional porosity on a surface is not different from that in Comparative Example 1, and the minute light scattering value is high.

Results in Comparative Examples 3 and 4 indicate that an optical element in which a solvent in a binder solution has solubility of water of 10% by weight or more in the solvent has a larger two-dimensional porosity on a surface than that in Comparative Example 1, and has a high minute light scattering value. It is considered that this is because some solvents for a binder solution may cause turbulence of particle arrangement on a film surface or inside thereof.

Results in Comparative Examples 5 and 6 confirm that even when a different silica raw material in a binder solution is used, an effect is not obtained with a silane-alkoxy hydrolysis condensate average particle diameter outside a range of 8 nm to 45 nm.

An optical member manufactured by the present invention can correspond to a transparent substrate having any refractive index, exhibits an excellent antireflection effect with respect to visible light, and has long-term weather resistance. Therefore, the optical member can be used as an optical device for a word processor, a computer, a television, various displays including a plasma display panel, and the like. In addition, the optical member can be used as an optical member for a polarization plate used for a liquid crystal display apparatus, various optical glass materials, a transparent plastic sunglass lens, a prescription glass lens, a camera finder lens, a prism, a fly eye lens, a toric lens, various optical filters, a sensor, and the like. Furthermore, the optical member can be used for a photograph optical system using these, an observation optical system such as a binocular telescope, or a projection optical system used for a liquid crystal projector or the like. In addition, the optical member can be used as an optical member for various optical lenses used for a laser beam printer or the like, such as a scanning optical system, covers of various meters, window glass for an automobile or a train, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-051150, filed Mar. 15, 2016, which is hereby incorporated by reference herein in its entirety.

What is claimed is:

1. A method for manufacturing an optical member, comprising:
    a step of applying a dispersion liquid containing particles and a dispersion medium on a substrate;
    a step of applying, on the substrate, a solution containing a component to form a binder after the step of applying the dispersion liquid, and causing the solution to permeate a portion between the particles; and
    a step of drying the layer to prepare an antireflection film, wherein
    the solution contains a silane-alkoxy condensate having an average particle diameter of 8 nm or more and 60 nm or less, and the solution contains a solvent having solubility of water of 10% by weight or less in an amount of 70% by mass or more.

2. The method for manufacturing an optical member according to claim 1, wherein
    the solvent contains any one or more kinds of solvents selected from the group consisting of 4-methyl-2-pentanol, 2-pentanol, 2-methyl-1-butanol, 3-methyl-1-butanol, and 2-ethyl-1-butanol.

3. The method for manufacturing an optical member according to claim 1, wherein
    the solvent contains any one or more kinds of solvents selected from the group consisting of 4-methyl-2-pentanol, 2-methyl-1-butanol, and 3-methyl-1-butanol.

4. The method for manufacturing an optical member according to claim 1, wherein the dispersion liquid and the solution are applied by a spin coating method.

5. The method for manufacturing an optical member according to claim 1, wherein
    a two-dimensional porosity of the antireflection film on a surface at a depth corresponding to an average particle diameter of the particles from the opposite side to the substrate of the antireflection film is 11% or more and 15% or less in a cross section containing a normal line on a surface of the substrate.

6. The method for manufacturing an optical member according to claim 1, wherein
    in the step of applying the dispersion liquid, the dispersion liquid is applied on a layer containing one or more layers formed of any one selected from the group consisting of zirconium oxide, titanium oxide, tantalum oxide, niobium oxide, hafnium oxide, alumina, silica, and magnesium fluoride on the substrate.

7. The method for manufacturing an optical member according to claim 1, wherein, through the step of drying the layer, the silane-alkoxy condensate becomes a binder bonding the portion between the particles.

8. The method for manufacturing an optical member according to claim 1, wherein
    each of the particles is a hollow particle.

9. The method for manufacturing an optical member according to claim 8, wherein
    the hollow particle contains silica.

10. An optical member having an antireflection film containing particles and a binder on a substrate, wherein
    a two-dimensional porosity on a surface at a depth corresponding to an average particle diameter of the particles from the opposite side to the substrate of the antireflection film is 11% or more and 15% or less in a cross section containing a normal line on a surface of the substrate.

11. The optical member according to claim 10, wherein the hollow particle is a hollow silica particle.

12. The optical member according to claim 10, wherein the thickness of the antireflection film is 80 nm or more and 200 nm or less.

13. The optical member according to claim 12, wherein an average particle diameter of the particles is 15 nm or more and 100 nm or less.

14. The optical member according to claim 10, wherein each of the particles is a hollow particle.

15. The optical member according to claim 14, wherein
    the thickness of a shell of the hollow particle is 10% or more and 50% or less of an average particle diameter of the hollow particle.

16. The optical member according to claim 15, comprising
    one or more layers formed of any one selected from the group consisting of zirconium oxide, titanium oxide, tantalum oxide, niobium oxide, hafnium oxide, alumina, silica, and magnesium fluoride between the substrate and the antireflection film.

17. An optical device comprising the optical member according to claim 16.

* * * * *